United States Patent [19]

Kuhn et al.

[11] Patent Number: 5,481,503
[45] Date of Patent: Jan. 2, 1996

[54] APPARATUS FOR AND METHOD OF ADAPTIVELY PROCESSING SONAR DATA

[75] Inventors: John P. Kuhn, Liverpool; Thomas S. Heath, Syracuse, both of N.Y.

[73] Assignee: Martin Marietta Corporation, Syracuse, N.Y.

[21] Appl. No.: 680,953

[22] Filed: Dec. 12, 1984

[51] Int. Cl.$^6$ .................. G06F 15/336; G01R 23/16; G81C 27/00
[52] U.S. Cl. ................. 367/100; 367/46; 364/582; 364/517
[58] Field of Search ................. 367/40, 45, 46, 367/49, 100; 364/421, 517, 572, 574, 582, 726; 381/46, 71, 94

[56] References Cited

U.S. PATENT DOCUMENTS

| | | | |
|---|---|---|---|
| 3,925,650 | 12/1975 | Braun | 364/517 |
| 4,238,746 | 12/1980 | McCool et al. | 377/54 |
| 4,243,935 | 1/1981 | McCool et al. | 367/135 |
| 4,270,025 | 5/1981 | Alsul et al. | 358/135 |
| 4,355,368 | 10/1982 | Leidler et al. | 367/100 |
| 4,381,428 | 4/1983 | Kolesar et al. | 364/513.5 |
| 4,412,340 | 10/1983 | Bartlett et al. | 364/728 |
| 4,416,552 | 11/1983 | Hessemer et al. | 374/122 |
| 4,559,602 | 12/1985 | Bates | 364/513 |

OTHER PUBLICATIONS

Hou, et al. "High Resolution . . . correlated Noise", Dec. 1982, pp. 1093–1031, Chin. Phys. (USA), vol. 2, #4.
Hou et al., "High Resolution . . . Correlated Noise", Nov. 1981, pp. 337–347, Acta Acusta, #6., Abst. Supplied for both above.

*Primary Examiner*—Nelson Moskowitz
*Attorney, Agent, or Firm*—Paul Checkovich; Stephen A. Young

[57] ABSTRACT

The invention discloses an apparatus for and a method of adaptively processing a sonar power spectrum for improving the display of narrowband line structure characteristic of a target in a background of broadband interference which is rippled due to multipath propagation arrival structure. The processor employs a first Fourier transformer to convert the sonar frequency data into a complex correlation format. The autocorrelation is then time difference sampled to separate the broadband ripple interference from the broadband trend interference. The separate time difference samples are then transformed back to their real frequency format to form a broadband ripple estimate and a broadband trend estimate of the interference background. The ripple estimate is subtracted from the sonar signal to remove the ripple component and the resulting difference is normalized by a division by the interference trend estimate. The result is improved detectability of the narrowband lines in the presence of widely varying multipath interference.

11 Claims, 9 Drawing Sheets

INPUT
POWER
SPECTRUM

NORMALIZED
OUTPUT

AUTO
CORRELATION

INPUT POWER SPECTRUM

SHEARING THRESHOLD

SHEARED POWER SPECTRUM

CORRELATION
MAGNITUDE
FUNCTION

THRESHOLDED
CORRELATION
MAGNITUDE
FUNCTION

HIGH PASS
BROADBAND
SPECTRUM

LOW PASS
BROADBAND
SPECTRUM

INPUT
SPECTRUM
−HIGH PASS
SPECTRUM

NORMALIZED
OUTPUT
POWER
SPECTRUM

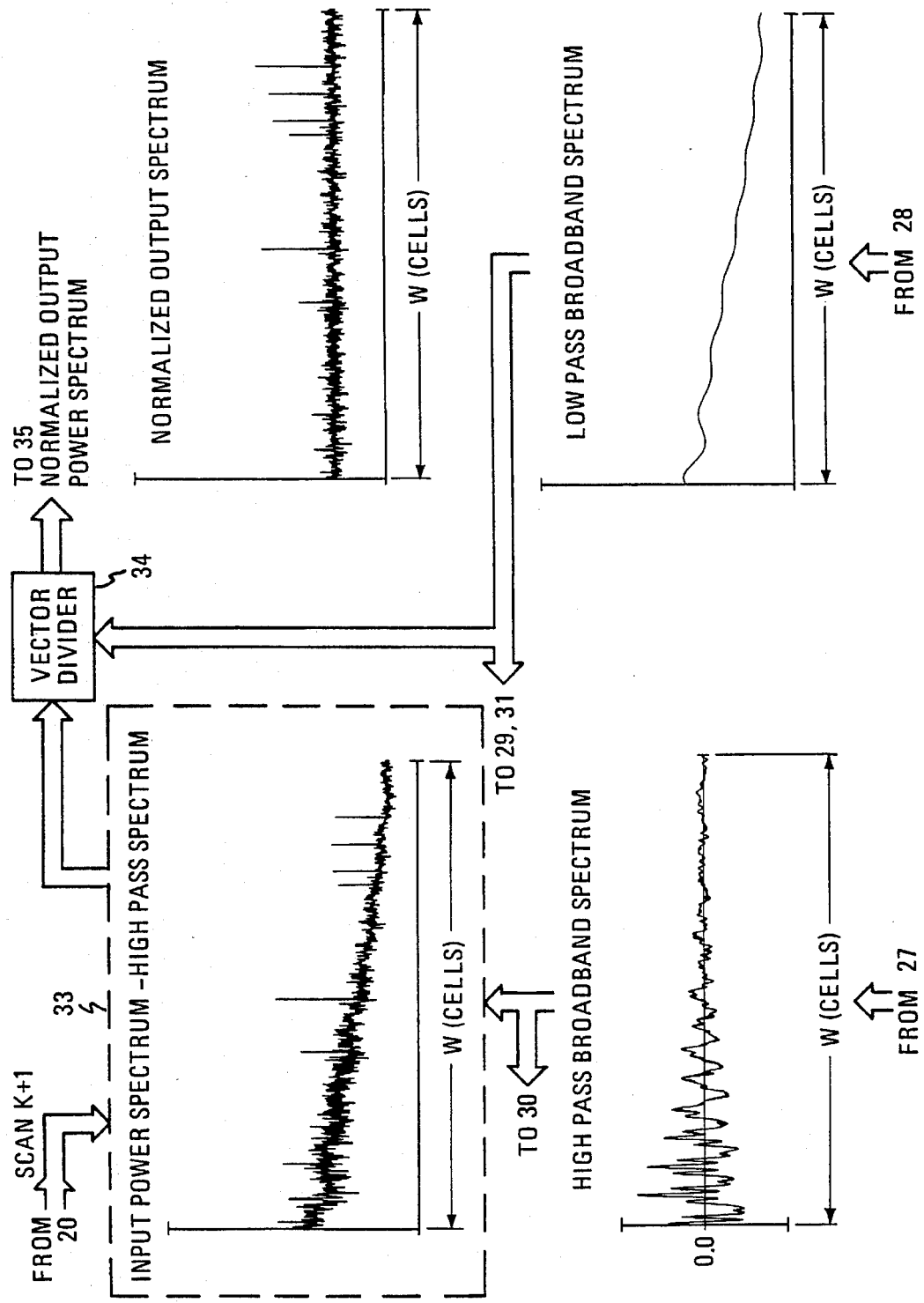

APPARATUS FOR AND METHOD OF ADAPTIVELY PROCESSING SONAR DATA

BACKGROUND OF THE INVENTION

1. Field of The Invention

The invention relates to sonar systems, and more particularly to the processing of received narrowband acoustic data used for the purpose of detecting, classifying, and localizing acoustic sources of interest. Such processors are designed to normalize narrowband source data against a broadband interference background and to reduce such interference.

2. Description of The Prior Art

Sonar data processors of the type of interest here are designed to improve the observability of a target's spectral line structure (narrowband lines or "tonals" in the presence of substantial "non-white" broadband interference.

Target detection and classification is the purpose of narrowband processing, which exploits the presence of tonal and/or narrowband line structure in the target's radiated signal spectrum. In the basic form, this process is implemented by observing power spectrum time history plots of the acoustic sensor output in the frequency band of interest. This process, traditionally performed by trained observers, can be automated by the addition of an auto-detect and track processor.

For a well-behaved background, the auto-detect and track processor has little trouble detecting and tracking low level "lines". However, in the presence of strong broadband interference, line structure from a target of interest can easily be masked or dominated by an interference pattern in the broadband spectrum caused by multipath arrivals from the broadband source. Depending on the multipath arrival structure, the broadband interference pattern may be very broad (with respect to frequency) or very narrow. For the situation where this pattern is very narrow, broadband energy appears as a set of narrowband "lines" which cause severe post processing problems (overloading or false alerts in the auto-detect and track function).

Auto-detect and track processing as well as narrowband processor displays require a flat power spectrum background with a known mean or average value, hence "whitening" of the received signal power spectrum is required. "Whitening" is the maintenance of the envelope of the spectral background noise at a constant intensity.

Broadband interference, which can dominate the spectral background, is dynamic since the type of pattern observed is a function of signal levels, multipath structure, and geometry, all of which change with time. Thus sonar processors, which lack an adaptive capability are of limited value in treating this type of broadband interference.

Accordingly, an adaptive approach to the processing of sonar data is essential.

SUMMARY OF THE INVENTION

It is an object of the present invention to provide an improved processor for sonar data preparatory to display.

It is another object of the present invention to provide an improved adaptive processor for sonar data.

It is still another object of the invention to provide an improved processor for normalizing sonar data preparatory to display.

It is a further object of the invention to provide an improved noise reducing processor for sonar data.

It is yet another object of the invention to produce a processor for improving the display of narrowband sonar data.

It is an object of the present invention to provide an improved method of adaptively normalizing sonar data preparatory to display.

It is another object of the present invention to provide an improved method of reducing noise in sonar data preparatory to display.

It is still another object of the invention to provide an improved method of processing sonar data preparatory to the display of narrowband data.

These and other objects of the invention are achieved in a novel adaptive normalization processor for sonar signals. The processor improves the detectability of discrete narrowband line data useful in target detection and classification in a background of broadband noise containing both relatively broad and narrow interference ripples due to multipath propagation.

The processor comprises an input port for connection to a source of received electrical sonar data in a periodically scanned power spectrum format; means to perform a real to complex Fourier transformation of the sonar data to form a complex autocorrelation function whose magnitude contains peak(s) at time differences in the scan corresponding to the broadband data; and means to compute the magnitudes of the complex autocorrelation function to form a correlation magnitude function.

The processor further comprises means responsive to the correlation magnitude function to select values of the complex autocorrelation function over time difference interval(s) containing the high intensity peak(s) while maintaining zero values for all other time differences in the scan to form a gated complex autocorrelation function in which broadband data is selected and narrowband line data is rejected; means to perform the inverse complex to real Fourier transformation of the gated complex autocorrelation function to obtain an estimate of the broadband data in a power spectrum format; and means to perform a vector division of the input sonar data for each scan by the broadband data estimate computed from the scan to normalize the narrowband line data in relation to said background for improved detectability. The quotient is coupled to an output port for application of the normalized electrical sonar data to a visual display.

In accordance with another facet of the invention, means are provided for adaptively shearing large amplitude narrowband line data in a given scan of the power spectrum to reduce error in the normalization process, the shearing function being computed from the prior scan.

In accordance with still another facet of the invention, means are provided for separately forming a high pass gated complex autocorrelation function in interval(s) embracing greater than near zero time difference peak(s) and a low pass gated complex autocorrelation function in an interval embracing near zero time difference peak(s). Separate Fourier transformation means are provided to perform the inverse complex to real Fourier transformation of the high pass and low pass gated complex autocorrelation functions to obtain separate estimates of the broadband interference ripple and the broadband interference trend. The broadband ripple estimate is then subtracted from the input sonar data to reduce any ripple therein to achieve a significant noise reduction. The difference quantity containing the sonar data is then divided by the estimated broadband trend to normalize the sonar data.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings, in which:

FIG. 2A illustrates the input power spectrum prior to processing in the novel-normalization processor; FIG. 2B illustrates the power spectrum after normalization; and FIG. 2C illustrates the autocorrelation magnitude typical of a four path condition.

FIG. 4A illustrates the input power spectrum; FIG. 4B illustrates the threshold characteristic of the amplitude shear; FIG. 4C illustrates the input power spectrum after shearing; Figure 4D illustrates the correlation magnitude function; FIG. 4E illustrates the correlation magnitude function after thresholding; FIG. 4F illustrates the isolated high pass broadband power spectrum depicting broadband ripple obtained by a second Fourier transformation; FIG. 4G illustrates the isolated low pass broadband power spectrum characterizing the broadband trend obtained by a second Fourier transformation; 4H illustrates the input power spectrum after a subtraction which removes broadband ripple; and FIG. 4I illustrates the normalized output power spectrum, and FIG. 5A, 5B, 5C, and 5D deal with the processing steps in a practical implementation of the normalization processor illustrated in FIG. 3.

DESCRIPTION OF THE PREFERRED EMBODIMENT

The data adaptive normalization processor in accordance with the present invention, is designed to improve the observability of a target's spectral line structure (narrowband and/or tonal) in the presence of substantial broadband interference. Therefore, the normalization process is applied to a sonor power spectrum to eliminate or reduce the interference. The process is adaptive to the type of interference being observed. Information about the shape of the received signal power spectrum is contained in the autocorrelation function. The key feature of the normalization processor to be described is that it uses the observed autocorrelation function to obtain the spectral normalizing function as opposed to currently used normalizers which are set up a priori.

Figure 3:
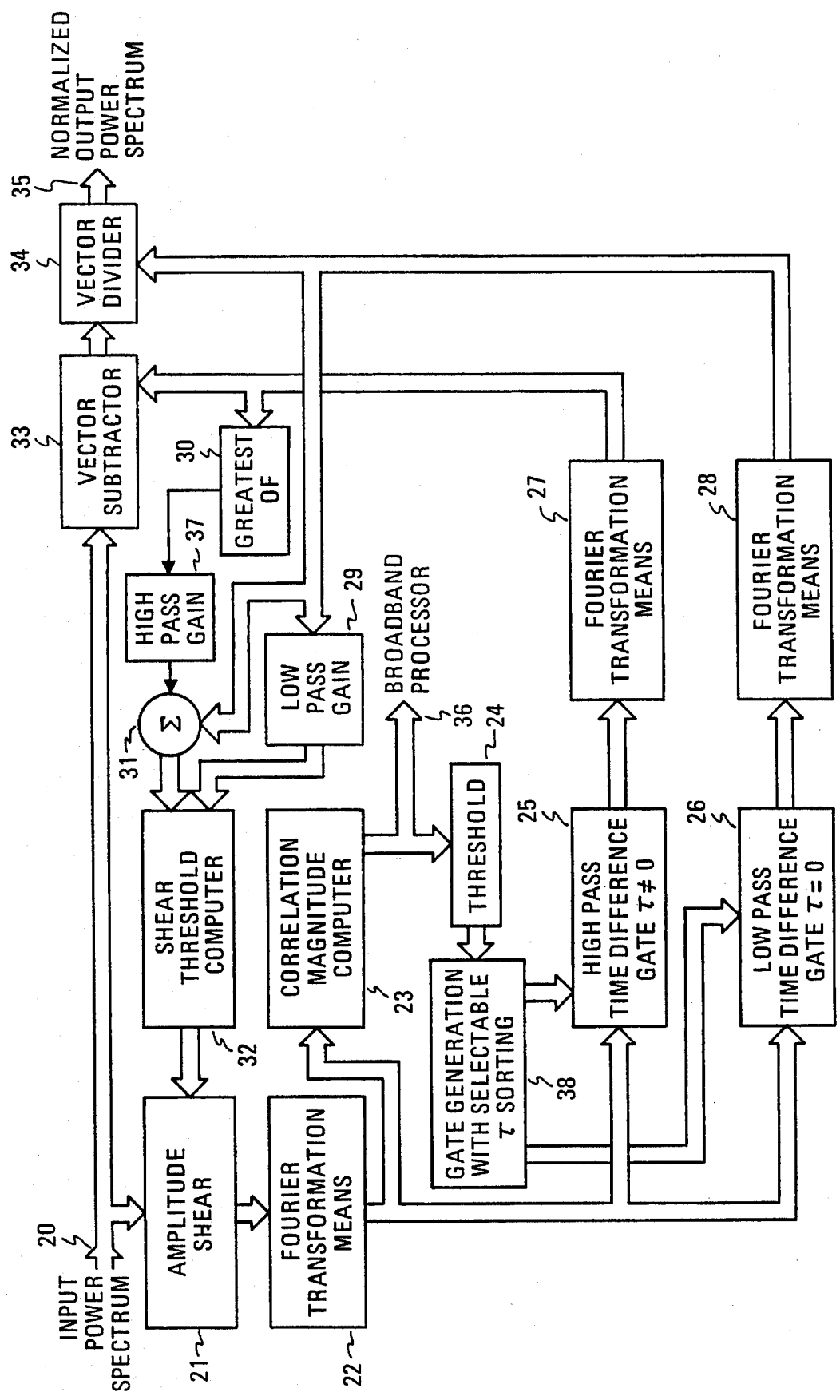
FIG. 3 is a block diagram of the normalization processor, the fifteen blocks or functional elements providing the requisite internal processor functions and the interconnections denoting the paths of the input and control signals through the processor.

A data adaptive normalization processor in accordance with the invention and which uses the observed (estimated) correlation function to obtain a spectral normalizing function on a per scan (time update) basis is illustrated in FIG. 3. The technique by which the broadband signal power spectrum is separated from the narrowband components, takes advantage of a simple duality principle. Narrowband signal energy is concentrated in small frequency intervals of the power spectrum, and is spread over large time difference intervals of the autocorrelation function. On the other hand, broadband signal energy is spread over large frequency intervals of the power spectrum, and is concentrated in small time difference intervals of the autocorrelation function. Thus, by gating the autocorrelation function within these small time difference intervals, one may effectively separate the broadband signal energy from the narrowband energy.

Based on this principle, the data adaptive normalization processor is gated on for appropriate small time difference intervals to select the information contained in the intervals of detected peaks of the correlation function estimate to obtain an estimate of the broadband (only) spectrum. This estimate is then used to remove broadband ripple and to normalize the original spectrum, leaving only narrowband components in a "white" background. Autocorrelation data is available at output port 36 as an intermediate output of the processor. This autocorrelation data may be used as an input for further processing for broadband multipath target localization and depth discrimination. The principal output of the spectrum normalization processor, available at output port 35 contains the target line structure now presented on a whitened spectral background for subsequent narrowband processing and visual display.

Figure 4A:
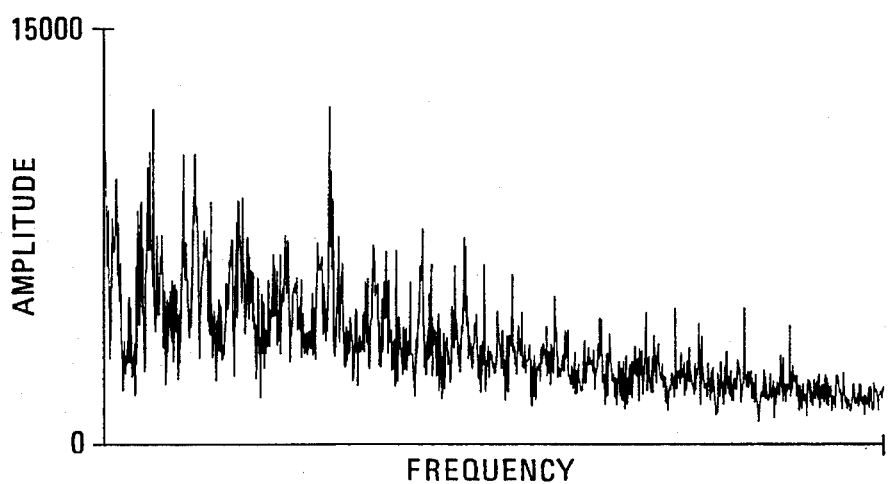
FIGS. 4A thru 4I illustrate the operation of the normalization processor upon representative simulated data in a four path situation.

The input data coupled to input port 20 of the normalization processor is a sample of a single scan of a short term sonar power spectrum. The input data which is recurrently scanned is an estimate with each scan. being in a parallel format. An illustration of the power spectrum using representative simulated data in which amplitude is graphed as a function of frequency, is illustrated in FIG. 4A. The illustration is designed to illustrate several narrowband lines, which may be signatures of a target, superimposed upon a rippled and gradually descending background of broadband interference.

Figure 4B:
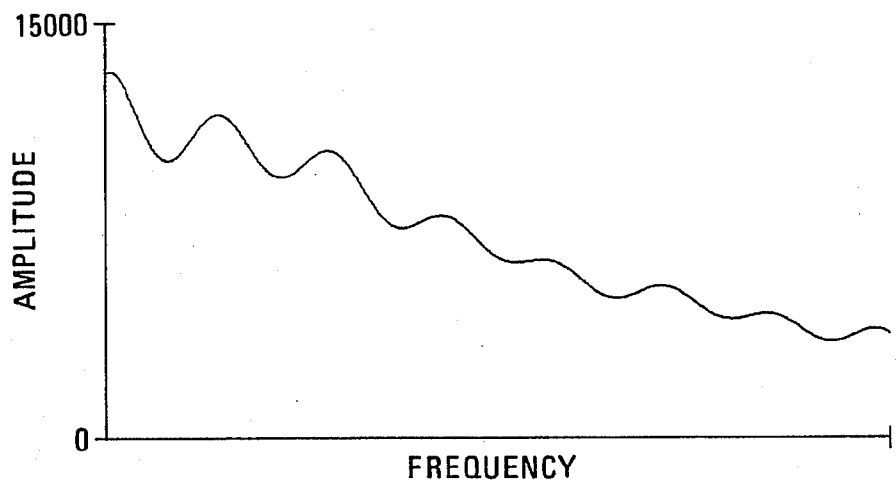
Figure 4C:
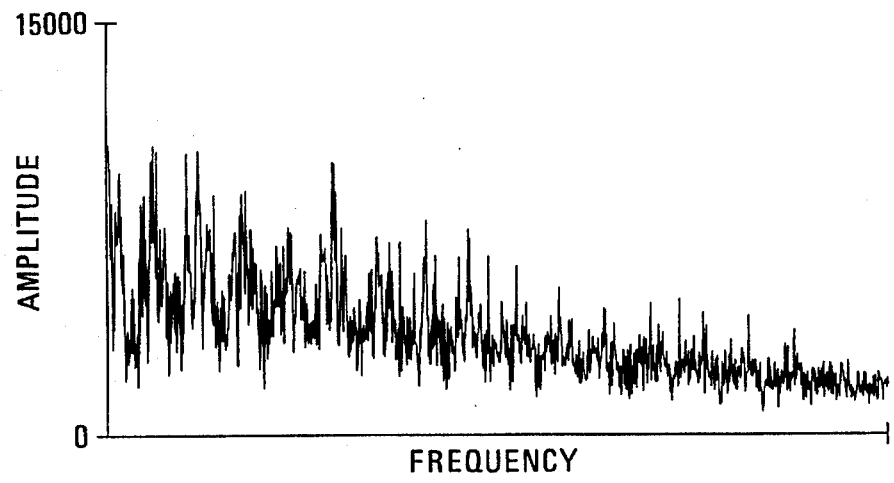
Figure 4D:
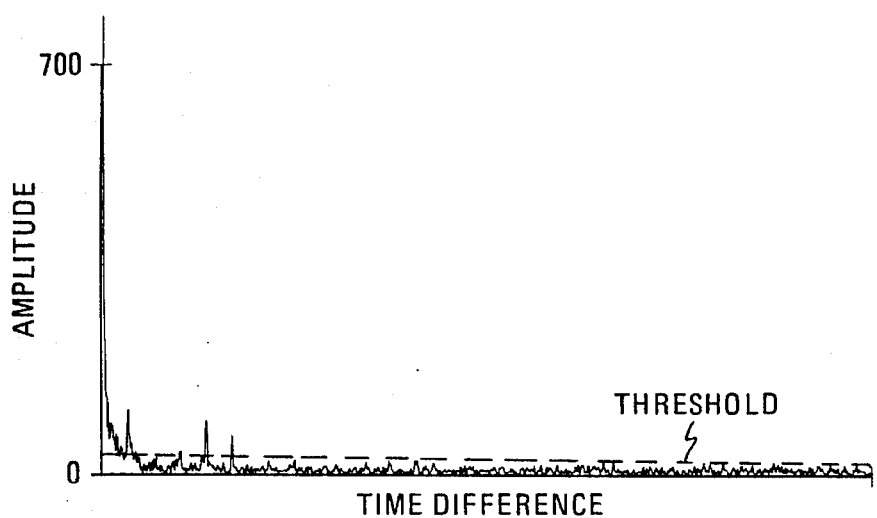
Figure 4E:
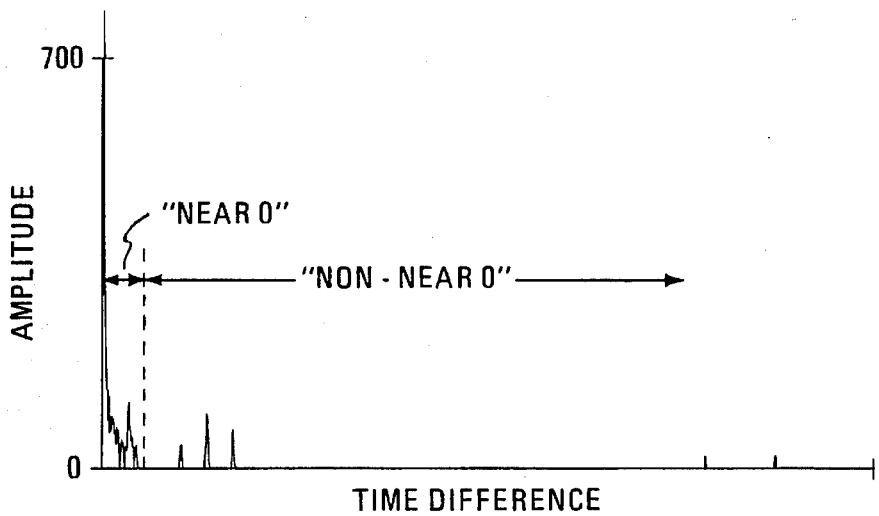
Figure 4F:
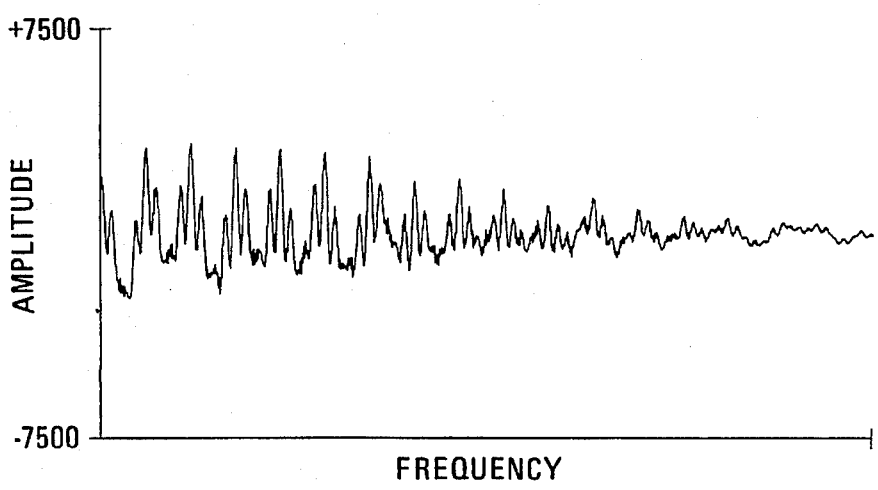
Figure 4G:
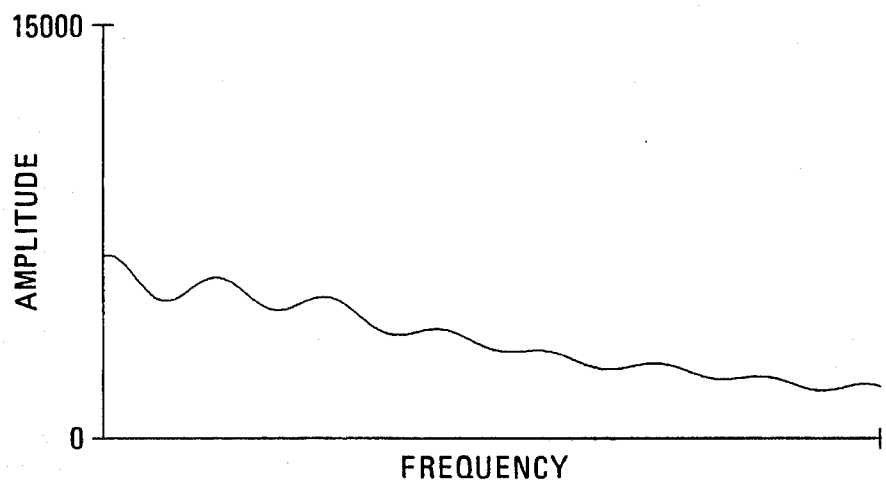
Figure 4H:
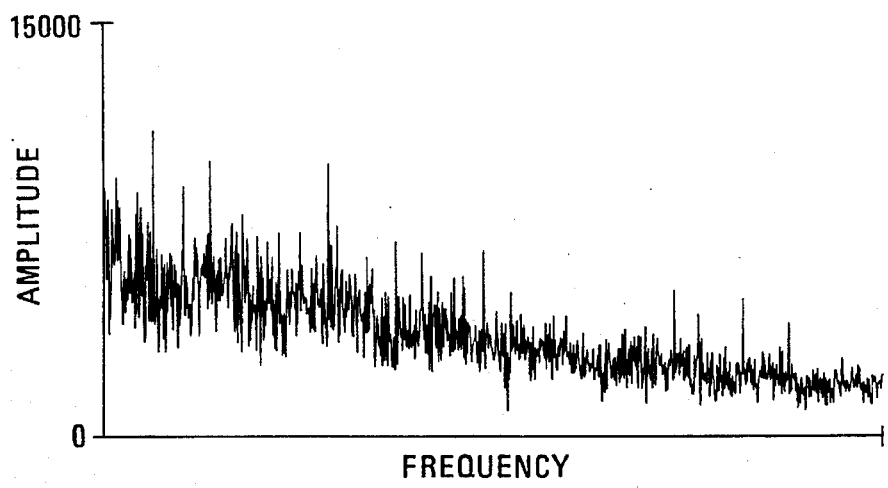
Figure 4I:
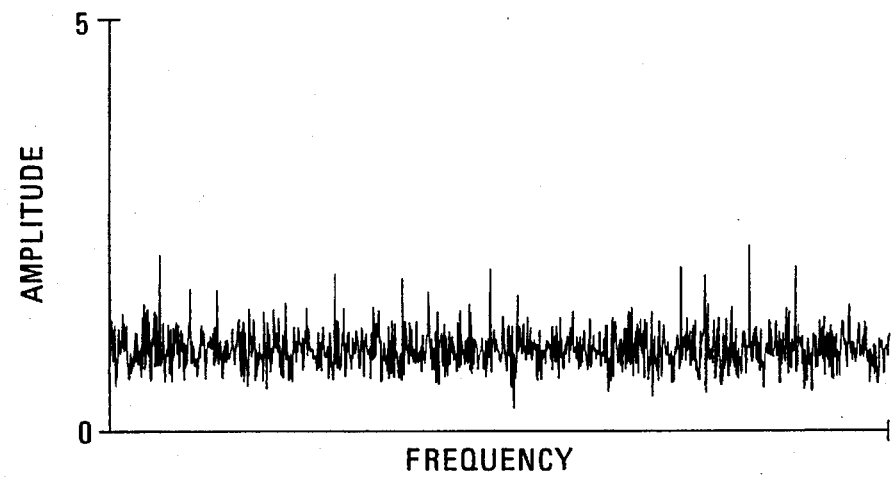

The principal output of the processor, which appears at output port 35, is illustrated in FIG. 4I. The output contains the same narrowband lines that were present in the input data, but they are now presented in a noise background which is largely devoid of ripple and of relatively smaller amplitude. The narrowband lines now appear to stand out more clearly from the background. The improvement in line structure detectability is due in part to the improved normalization.

The input data from input port 20 is next coupled to the amplitude shear 21 which shears very large lines in the input power spectrum under the control of a feedback network to be described below. The shearing threshold is obtained from the shear threshold computer 32. In the feedback network, the shearing threshold is computed for a given (K+1)th scan from the prior (Kth) scan. The shearing threshold, derived from representative simulated data is illustrated in FIG. 4B. The threshold approximately follows the upper limits of the input spectrum of FIG. 4A with occasional narrowband lines exceeding the threshold.

The sheared power spectrum appearing at the output of the amplitude shear 21 is shown at FIG. 4C. The shearing of the larger lines, noted earlier and which is evident on close comparison of the waveforms of FIG. 4A and 4C, is performed to keep the large lines from dominating the derivation of the autocorrelation function.

The sheared autospectrum from the amplitude shear 21 is coupled to the Fourier transformation means 22 to obtain the autocorrelation function. A suitable computation may be obtained using the Fast Fourier Transformation algorithm. The data is here converted from the real to the complex format.

The complex autocorrelation function at the output of means 22 is formatted for each of a plurality of time difference interval cells in serial order corresponding to the number of the cell. The total number (I) of cells is typically from $10^2$ to $10^3$. The data for each ($i^{th}$) cell consists of real and imaginary components:

$$CELL_i = T_{REAL_i} + jT_{imag_i}; 1 \leq i \leq I \qquad (1)$$

where T is an amplitude.

The output of means 22 in a complex format is then converted to a resultant correlation magnitude in the correlation magnitude computer 23. The computer 23 computes the resultant magnitude for each ($i^{th}$) cell in serial order to obtain the amplitude characteristic shown in FIG. 4D. The correlation magnitude function is now in a form suitable for further broadband processing (which is not a part of the present invention), and may be coupled to a data output port 36 for that purpose.

However for the narrowband processing to which the present invention is addressed, the correlation magnitude function is now coupled to the threshold 24 which isolates the correlation peaks in the time difference domain. The electrical quantity produced by the threshold is then coupled to the gate generation means 38, which produces a time difference gating quantity having a logical 1 or 0 state suitable for time difference gating the autocorrelation function for high pass or low pass filtering. The threshold in 24 has a substantially fixed slope with a higher value for the lowest numbered cells (lowest time difference) and a lower value for the highest numbered cells (highest time difference). This is consistent with the occurrence of the strongest peaks at time difference (tau) near zero. The threshold is set sufficiently high to pass only the anticipated peaks of the autocorrelation function. In the gate generation means, the number of cells used in the gating function in the vicinity of the (tau) peaks may be set to exceed the actual number of cells in which the threshold is exceeded by an arbitrary number selected by the operator. In the vicinity of each ($\tau \neq 0$) peak, the thresholded quantity may be expanded to include additional (M) higher and lower cells, also at the choice of the operator. The gating function, having either a value of one in the cells containing the expanded peaks or a value of zero, is now in a form suitable for application to the time difference gates 25, 26.

As a step in the filtering which reduces the broadband background, the complex autocorrelation function is coupled to the single input ports of the gates 25, 26 for control by the logical gating function. The ($\tau \neq 0$) logical gating function is coupled to the control input of the first "high pass" time difference gate 25 and the $\tau = 0$ logical gating function is coupled to the control input of a second "low pass" time difference gate 26. The complex autocorrelation function from 22 is coupled to the signal input ports of the gates 25 and 26. The high pass gate 25 is controlled to pass signals at non-zero time difference values (tau $\neq 0$), and the low pass gate 26 is controlled to pass signals at "near zero" time difference values (tau=0) as shown in FIG. 4E. The output of the high pass gate 25 contains peaks at intermediately numbered cells corresponding to non "near zero" time differences as shown in FIG. 4E. The output of the low pass gate 26 contains peak(s) at the initial cells.

The time difference gated correlation functions are next transformed by means 27 and 28 respectively back to a real power spectrum format to complete the desired low pass and high pass filtering and to obtain the broadband ripple separated from the broadband trend. To achieve this objective, the time difference gated complex autocorrelation quantity from gate 25 is coupled to the second Fourier transformation means 27 which reconverts the gated complex autocorrelation sample back to a real power spectrum format, the reconverted form being shown at FIG. 4F. The reconverted high pass gated broadband spectrum is rippled, repeating the ripples of the original input power spectrum 20, but is bi-directional about a zero mean value. The time gated complex autocorrelation quantity from gate 26 is coupled to the third Fourier transformation means 28 which reconverts the complex autocorrelation sample back to a real power spectrum format as shown at 4G. The reconverted broadband low pass spectrum contains slight rippling but is primarily a relatively slowly varying trend, repeating the trend shown in the original input power spectrum 20.

The main path of the input power spectrum through the normalization processor passes successively through the vector subtractor 33 in which the broadband ripple is largely removed, followed by passage through the vector divider 34 in which the output of the vector subtractor is normalized in relation to the broadband trend. These effects will be considered, initially assuming that the internal feedback path establishing the amplitude level of the shear 21 has been established at the correct setting. The vector subtractor 33 accepts the input power spectrum (in real format) and subtracts the output of the Fourier transformation means 27, also in a real format from it. The difference which is obtained is shown in FIG. 4H. By comparison with the original data of FIG. 4A, it may be seen that the periodic ripple component is largely gone.

Figure 1:
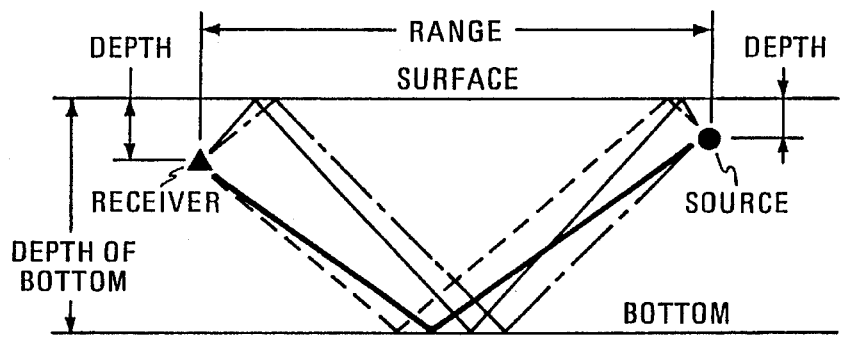
FIG. 1 is a simplified side elevation view, using an exaggerated vertical scale, of four geometrical paths for sound radiated from a source to a receiver, both source and receiver being submerged in a body of water such as the sea under "bottom bounce" conditions.
Figure 2A:
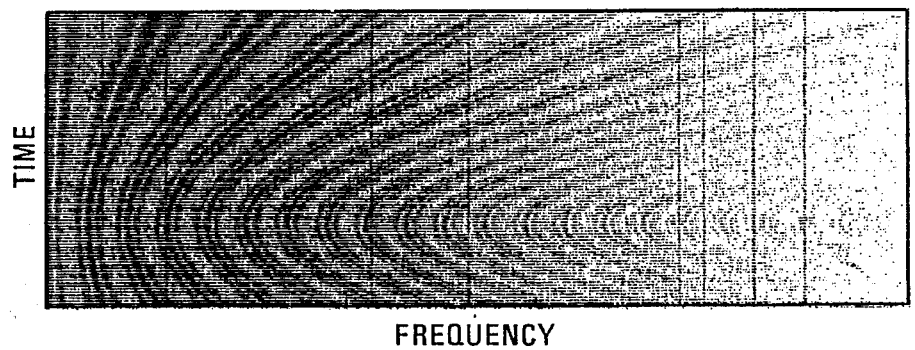
FIGS. 2A, 2B and 2C are visual displays (intensity plots) of the received sea data under multipath conditions, in which amplitude is graphed as a function of frequency or time difference (tau) and clock time, with the darkening indicating greater signal intensity.
Figure 2B:
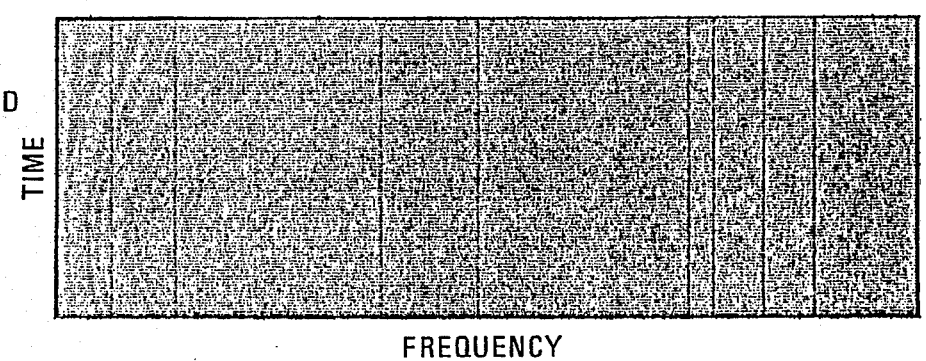
Figure 2C:
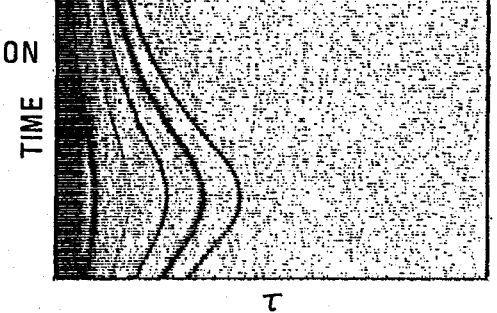

After subtraction of the rapidly varying broadband components, the power spectrum remainder is divided in the vector divider 34 by the real broadband "trend" obtained at the output of the Fourier transformation means 28. The quotient power spectrum waveform, as seen in FIG. 4I, contains several narrowband peaks, is substantially free of broadband ripples, and retains a nearly constant noise background. The 4I illustration shows a relatively low amplitude noise, and more clearly delineated peak(s) corresponding to the narrowband signatures of a target. The visual improvement in delineation is substantially as shown in the intensity plot of FIG. 2B. The final result is a more readily detectable narrowband line structure.

The shearing threshold used in the amplitude threshold 21 is computed by the shear threshold computer 32 acting upon inputs supplied by the Blocks 29, 30, 31, and 37 acting upon the broadband "ripple" FIG. 4F and the broadband "trend" FIG. 4G produced by the Fourier transformation means 27 and 28 respectively. More particularly, the threshold of the amplitude shear is renewed for every scan. In this renewal, the threshold for the $(K+1)^{th}$ scan is obtained by the computation taking place during the prior $K^{th}$ scan. The value of the shearing function is derived by generating a first input quantity $B_i$ which is equal to the trend waveform 4G times a "low pass" gain produced in the Block 29. A suitable scalar gain is 2. The other input quantity $A_i$ is the largest value for the high pass spectrum times a high pass gain produced in Block 27 plus the low pass spectrum for all cells. The quantities $A_i$ and $B_i$ are then compared and the shearing threshold is set to the greatest of $[A_i, B_i]$ for all values of i for a given scan. The form of the threshold waveform and its creation will be dealt with in greater detail below.

The sonar derived input power spectrum is implemented by the processor described in FIG. 3, performing the steps particularized in FIGS. 5A thru 5D.

Figure 5A:
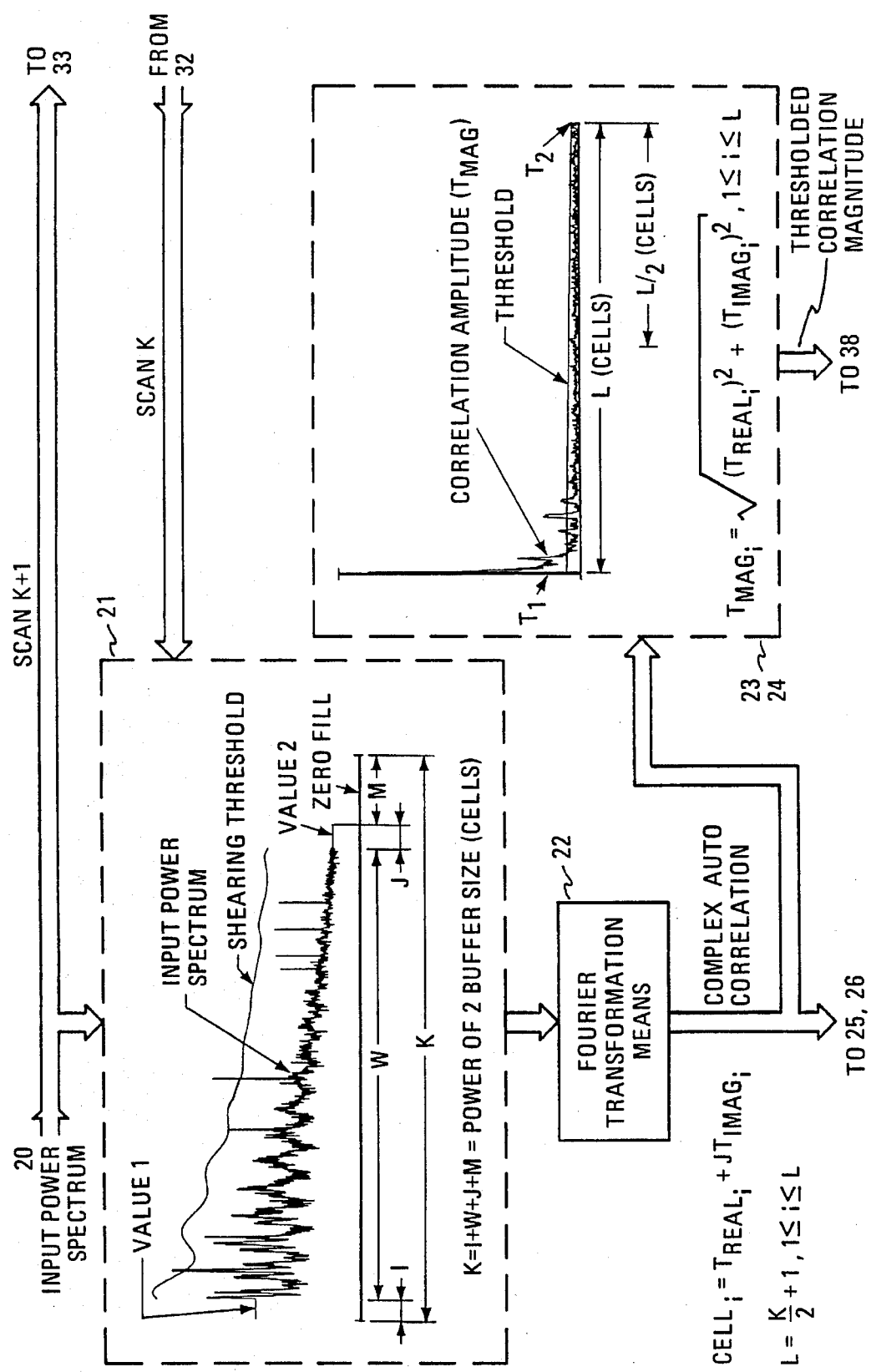
FIG. 5A illustrates the processing steps associated with Blocks 21, 22, and 23 of the processor.

The input power spectrum of simulated sonar data is shown in FIG. 5A in association with Block 21, in which each scan of the sonar power spectrum is sheared prior to Fourier transformation. The input power spectrum is also supplied to the vector subtractor 32 (FIG. 5C). The data is supplied in a parallel format of "W" input cells to the input buffer of the normalization processor which has "K" cells. The "W" input cells are supplemented at the lower and upper band edges by cells I, and J respectively to remove undesirable edge response when normalization is performed. Intervals I and J are filled with real "out of band" data or with artificial data having "Value 1" and "Value 2" (as shown in FIG. 5A). The values in the case of artificial data are computed from small "in band" windows at each band edge of the power spectrum. In addition, M input cells to be filled with zero values are provided at the upper band edge to bring the Fourier transformer input buffer to a power of two across the the spectrum. This is required when the Fourier transformation is implemented with an FFT (Fast Fourier Transformation) algorithm.

Figure 5B:
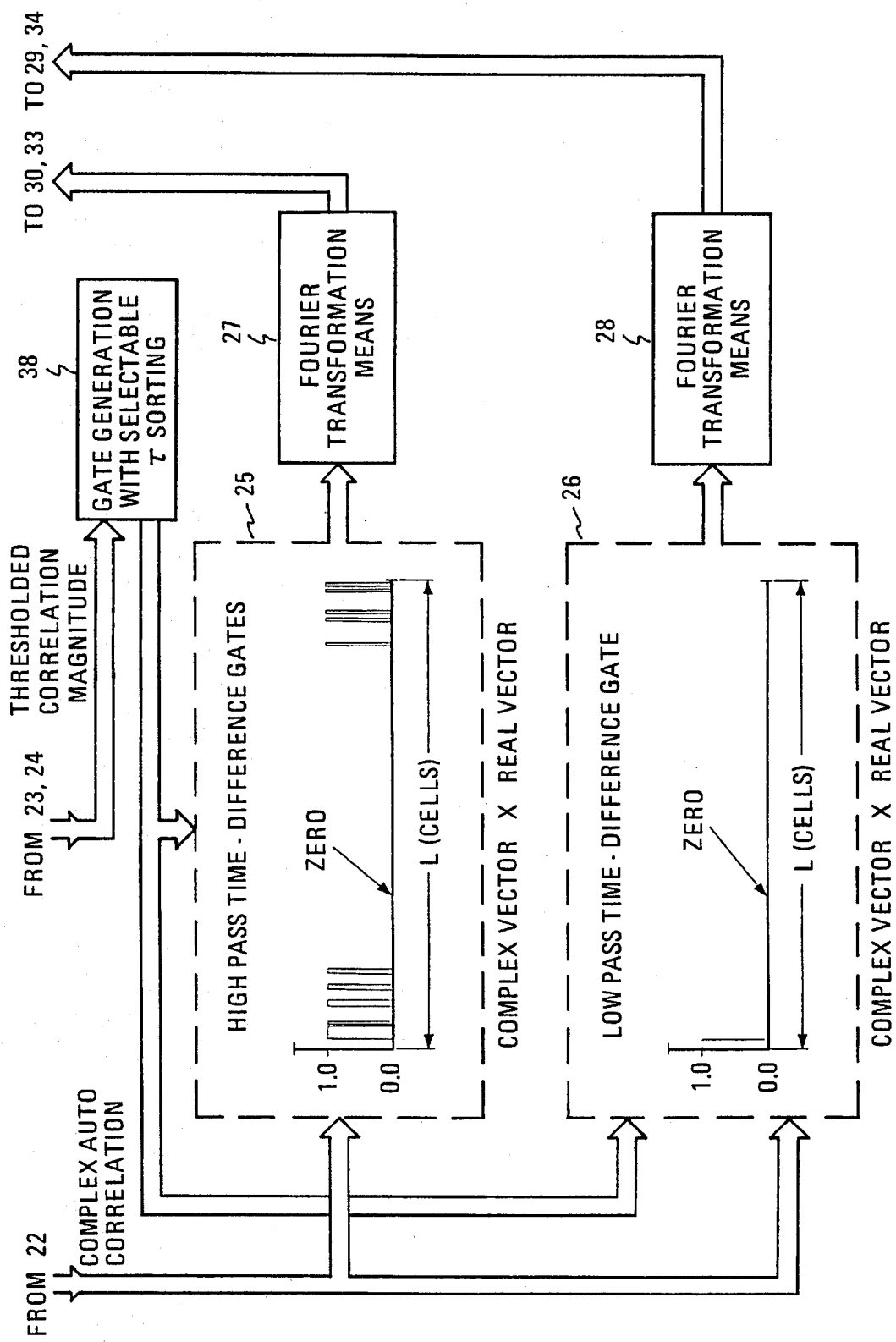
FIG. 5B illustrates the processing steps associated with Blocks 25, 26, 27, 28 and 38 of the processor.
Figure 5D:
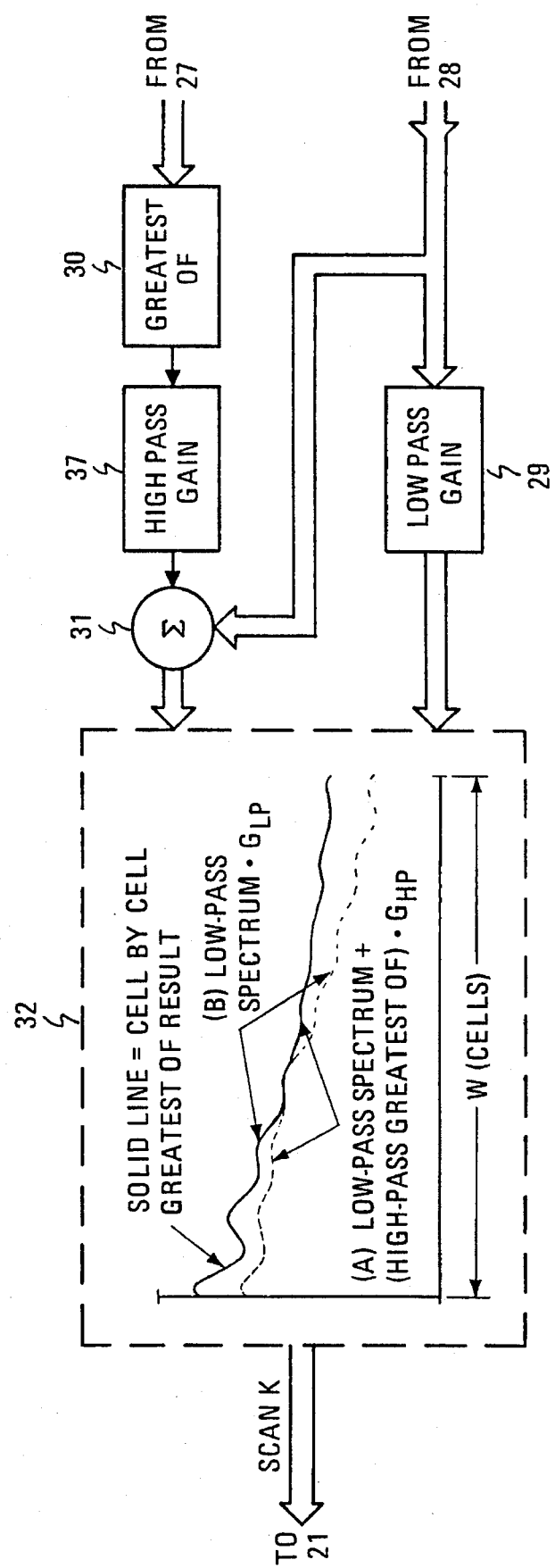
FIG. 5C illustrates the processing steps associated with the Blocks 29, 30, 31, 32, and 37.

The shearing is performed on the input power spectrum in Block 21 by a point by point (cell by cell) method prior to the Fourier transformation. The shearing threshold shown in FIG. 5A is computed from the previous scan as illustrated in FIG. 5D. The shear sets values of the spectrum input signal exceeding the shearing threshold equal to the threshold. (Values below the shearing threshold are unmodified.)

The Fourier transformation occurs in Block 22. The power of two spectrum buffer is coupled to the Fourier transformation means 22. Since a one sided transformation is performed (which saves computation time), the output is L complex samples where L=K/2+1. Appropriate "unravelling" and "scaling" should be performed according to the particular Fourier transformation implementation used. The L complex samples at the output of the Fourier transformation means 22 form the "complex autocorrelation estimate", where the $i^{th}$ sample is the correlation estimate in the $i^{th}$ time difference cell. The complex autocorrelation estimate is the input supplied to the correlation magnitude computer 23 and the high pass and low pass time difference gates 25, 26.

The complex autocorrelation estimate is next passed through the high pass and low pass gates 25, 26 under control of the threshold 24 and the gate generator 38 for separate application to the complex to real Fourier transformation means 27, 28. The gating operation is depicted in FIG. 5B.

The gating signal for operation of the gates 25, 26 is obtained by thresholding the correlation magnitude function produced in 23, and by coupling the thresholded correlation magnitude to the gate generator 38 which provides selectable time difference ($\tau$) sorting.

The gating process is a vector multiplication of the complex autocorrelation estimate from Fourier transformation means 22 by a gate vector supplied from the gate generator 38. Each gate vector supplied by the threshold 24 is L-cells long (the same number of cells as in the complex autocorrelation estimate) with the amplitude in each cell being either unity or zero. The logical correlation function is formed from a cell by cell comparison of the correlation amplitude with the threshold. The amplitude value of the logical correlation 24 is unity if the correlation amplitude is greater than or equal to the threshold, otherwise the amplitude value is zero.

The output of the threshold 24 is next coupled to the gate generator 38 in which the logical correlation function is used to form separate high pass and low pass gating signals for the gates 25, 26.

The interval(s) during which the gate signal vectors have a unity amplitude are determined by the thresholding process performed in 24, by a selection of the low pass index (LPI) and by determination of an appropriate enabling interval M. The last two adjustments take place in the gating generator 38 which creates the two gating vectors.

For the high pass gate vector, cells 1 to LPI have an amplitude value of zero, and cells (LPI+1) to L have an amplitude value equal to the logical correlation amplitude value for each corresponding cell. For the low pass gate vector, cells 1 to LPI have an amplitude value equal to the logical correlation amplitude value for each corresponding cell, and cells LPI+1 to L have an amplitude value of zero. The enabling intervals (amplitude equals unity) of the gate functions may be expanded ±M cells where M is a selectable value usually in the range of $0 \leq M \leq 5$. The sorting boundary LPI is selectable a priori based on the processing frequency band (K) and frequency band of the data (W). Selection of LPI equal to L forces the process to an "all division" normalization mode since the high pass time difference gates will be entirely zero. (LPI cannot be set to zero, since a forbidden division by zero, would occur in the vector divider 34.)

Gating of the complex correlation function is accomplished in the gates 25, 26 by performing complex/real vector multiplications. The complex correlation vector (L cells) from 22 times the real high pass gate vector (L cells) from 38 results in the high pass gated complex correlation function (L cells) for input to the complex to real Fourier transformer. The complex correlation vector (L cells) times the real low pass gate vector (L cells) from 38 results in the low pass gated complex correlation function (L cells) for input to the complex to real Fourier transformation means.

The high pass gated complex correlation function (L cells) is Fourier transformed (L complex cells to K real cells) resulting in the real high pass broadband spectrum (K cells). The beginning "out of band" I cells and ending "out of band" J+M cells are stripped off leaving W cells of in band data. This data is input to the vector subtractor 33 (FIG. 5C) and input to the shearing threshold computer (FIG. 5D).

The low pass gated complex correlation function (L cells) is Fourier transformed (L complex cells to K real cells) resulting in the real low pass broadband spectrum (K cells). The beginning "out of band" I cells and ending "out of band" J+M cells are stripped off leaving W cells of in band data. The data is input to the vector divider 34 (FIG. 5C) and input to the shear threshold computer 32 (FIG. 5D).

As shown in FIG. 5C, the high pass broadband spectrum (W cells) is subtracted from the input power spectrum (W cells), where any rapidly varying broadband interference pattern (with respect to frequency) is removed from the input power spectrum. This results in a difference spectrum which consists of narrowband line structure and a slowly varying (trend) background (with respect to frequency). This data is input to the vector divider 34.

In the vector divider 34, the resulting difference spectrum obtained from 33 is divided by the low pass broadband spectrum resulting in normalized output spectrum at 35 consisting of narrowband line structure in a noise background which is flat with respect to frequency.

The determination of the setting for the threshold for the amplitude shear 21 is described in FIG. 5D. It entails inputs from the Fourier transformation means 27, and 28, and the Blocks 29, 30, 31, 32 and 37. The amplitude of each cell in the real valued high pass spectrum is compared in the "Greatest Of" Block 30 to select the largest positive value. This is a scaler value which is multiplied by a selectable high pass gain ($G_{HP}$), and then added in summer 31 to the amplitude of each cell of the low pass spectrum. This results in the function "A" at the input to the cell by cell Greatest Of operation.

The amplitude of each cell of the low pass spectrum is multiplied by a selectable gain ($G_{LP}$). This results in the function denoted by B at the input to the shear threshold computer 32.

A cell by cell comparison of the amplitudes of the input functions at A and B is performed in the shear threshold computer, keeping the greatest value between A and B. The arrangement provides a shearing threshold computed from data of the $K^{th}$ scan to be applied in input power spectrum data of the $(K+1)^{th}$ scan over the W "in band" frequency cells of interest.

The selection in FIG. 5D of $G_{HP}=0$ will disable either or both of the respective "feedback" channels.

The invention is suitable for practice in a variety of differing forms. While the functions may be performed by individual integrated and discrete circuits the degree of complexity of the total system is sufficiently low such that it may be integrated into a single monolithic circuit.

What is claimed is:

1. An adaptive normalization processor of a sonar power spectrum for improving the detectability of discrete spectral line data for target detection and classification in a background of broadband noise containing both relatively broad and narrow (with respect to the center frequency of the spectral band) interference ripples due to the reception of broadband signals via multipath propagation, said processor comprising:

A. an input port for connection to a source of sonar spectral data in a periodically scanned power spectrum format containing both said spectral line data and said broadband background;

B. means to perform a real to complex Fourier transformation of said sonar data in said power spectrum format to form a complex autocorrelation function whose magnitude contains peak(s) at time differences in said scan corresponding to the inverse of the period of the interference ripples in the broadband spectral data;

C. means to compute the magnitudes of said complex autocorrelation function to form a correlation magnitude function;

D. means responsive to said correlation magnitude function to select values of said complex autocorrelation function over time difference interval(s) containing said high amplitude peak(s) while maintaining zero values for all other time difference in said scan to form a gated comples autocorrelation function from which only the broadband spectrum is derived;

E. means to perform the inverse complex to real Fourier transformation of said gated complex autocorrelation function to obtain an estimate of said broadband data in a power spectrum format;

F. means to perform a vector division of said imput sonar data for each scan by said broadband data estimate computed from said scan to normalize said spectral line data in relation to said background for improved detectability; and G. an output port for application of said normalized electrical sonar data to a visual display.

2. An adaptive sonar processor as set forth in claim 1 wherein

D(1). said means (D) comprises means to threshold said correlation magnitude function to produce a logical correlation function having an enabling state for time difference interval(s) which contain peak(s) above said threshold; and D(2). gating means responsive to said logical correlation function to form said gated complex autocorrelation function by selecting values of said complex autocorrelation function over enabled time difference interval(s) and maintaining zero values for all other time differences in said scan.

3. An adaptive sonar processor as set forth in claim 2 wherein:

D(2)i said means D(2) comprises means for generating a first gating signal responsive to said logical correlation function above a selectable time difference and a second gating signal responsive to said logical correlation signal below said selectable time difference.

4. An adaptive sonar normalization processor as set forth in claim 3 having in addition thereto:

H. means having its input coupled to said means (A) and its output coupled to said Fourier transformation means (B) for adaptively shearing large amplitude (with respect to the envelope of the broadband data) spectral line data in a given scan to reduce error in normalization, the shearing function being computed from the prior scan;

I. means responsive to the output quantity obtained from means (E) to compute said shearing function from said prior scan.

5. An adaptive sonar normalization processor as set forth in claim 4 wherein:

B' said Fourier transformation means (B) in the presence of multipath propagation produces peak(s) in said complex autocorrelation function at near zero and greater than near zero time differences;

D(1)' said thresholding means (D1) produces a logical correlation function having an enabling state in interval(s) embracing said greater than near zero time difference peak(s) and in interval(s) embracing said near zero time difference peak(s);

D(2) (ii) said gating means (D2) comprises means responsive to said first gating signal to form a high pass gated complex autocorrelation function in interval(s) embracing said greater than near zero time difference peak(s) and maintains zero values for all other time differences in said scan; and D(2)(iii) means responsive to said second gating signal to form a low pass gated complex autocorrelation function in an interval embracing said near zero time difference peak(s) and maintains zero values for all other time differences in said scan;

E(1) said Fourier transformation means (E) comprises means to perform the inverse complex to real Fourier transformation of said high pass gated complex autocorrelation function to obtain an estimate of said broadband interference ripple in said scan; and E(2) means to perform the inverse complex to real Fourier transformation of said low pass gated complex autocorrelation function to obtain an estimate of said broadband interference trend in said scan, the output thereof being coupled to the input of said means (F) and having in addition thereto;

J. means having an input coupled to said source (A) and another input coupled to the output of said means E(1) and the output thereof coupled to the input of said means F to perform a vector subtraction of said broadband ripple estimate from said input sonar data to reduce any ripple therein;

whereby the difference quantity obtained from J is subjected to a vector division in means F by said estimated broadband trend from means E(2) for normalization.

6. An adaptive sonar normalization processor as set forth in claim 5 wherein:

I(1) said means I is responsive to a function of the output quantities obtained from means E(1) and E(2) to compute said shearing function from the prior scan to reduce the adverse effect of large amplitude spectral lines in the scan provided to said means C.

7. A method of adaptively normalizing a sonar power spectrum to improve the detectability of discrete spectral line data for target detection and classification in a background of broadband noise containing both relatively broad and narrow (with respect to the center frequency of the spectral band) interference ripples due to the reception of broadband signals via multipath propagation, said method comprising the steps of:

A. providing said sonar electrical data in a periodically scanned power spectrum format, B. performing a real to complex Fourier transformation of said sonar data to form a complex autocorrelation function, C. computing the magnitudes of said complex autocorrelation function to form a correlation magnitude function; whose magnitude contains peak(s) at time differences in said scan corresponding to broadband data;

D. selecting values of said complex autocorrelation function over time difference interval(s) containing said intensity peak(s) while maintaining zero values for all other time differences in said scan to form a gated complex autocorrelation function in which broadband data is selected and spectral line data is rejected, E. performing the inverse complex to real Fourier transformation of said gated complex autocorrelation function to obtain an estimate of said broadband data in a power spectrum format;

F. dividing said input power spectrum for each scan by said broadband data estimate computed from said scan to normalize said spectral line data in relation to said background for improved detectability; and G. coupling said normalized electrical sonar data to an output port for application to a visual display.

8. The method of adaptively normalizing sonar data as set forth in claim 7 wherein:

D(1). said step (D) comprises thresholding said correlation magnitude function to produce a logical correlation function having an enabling state for time difference interval(s) which contain peak(s) above said threshold; and D(2). gating said complex autocorrelation function in response to said logical correlation function to form a gated complex autocorrelation function, said gated function being formed by selecting values of said complex autocorrelation function over enabled time difference interval(s) and maintaining zero values for all other time differences in said scan.

9. The method of adaptively normalizing sonar data as set forth in claim 8 wherein:

D(2)i said step D(2) comprises generating a first gating signal responsive to said logical correlation function above a selectable time difference and generating a second gating signal responsive to said logical correlation signal below said selectable time difference.

10. The method of adaptively normalizing sonar data as set forth in claim 9 having in addition thereto the steps of:

H. adaptively shearing large amplitude (with respect to the envelope of the broadband data) spectral line data in a given scan of said sonar power spectrum to reduce error in normalization, the shearing function being computed from the prior scan; and I. computing said shearing function from said estimate of said broadband data obtained in step (E) in said prior scan.

11. The method of adaptively normalizing sonar data as set forth in claim 10 wherein:

D(1)' said thresholding step (D1) produces a logical correlation function having an enabling state in interval(s) embracing peak(s) in said complex autocorrelation function at greater than near zero time differences and in interval(s) embracing near zero time difference peak(s);

D(2) (ii) said gating step (D2) comprises forming a high pass gated complex autocorrelation function in response to said first gating signal in interval(s) embracing said greater than near zero time difference peak(s) and maintaining zero values for all other time differences in said scan; and D(2)(iii) forming a low pass gated complex autocorrelation function in response to said second gating signal in an interval embracing said near zero time difference peak(s) and maintaining zero values for all other time differences in said scan;

E(1) said Fourier transformation step E, comprising performing the inverse complex to real Fourier transformation of said high pass gated complex autocorrelation function to obtain an estimate of said broadband interference ripple in said scan, and E(2) performing the inverse complex to real Fourier transformation of said low pass gated complex autocorrelation function to obtain an estimate of said broadband interference trend in said scan, and J. performing a vector subtraction of said broadband ripple estimate from said input sonar data to reduce any ripple therein;

whereby the difference quantity obtained in step J is subjected to a vector division in step F by said estimated broadband trend for normalization.

* * * * *